Jan. 14, 1969

H. E. OBERG 3,421,472

AMPHIBIOUS VEHICLE

Filed April 10, 1967

HUGH. E. OBERG
INVENTOR

Huebner & Worrel
ATTORNEYS

Jan. 14, 1969
H. E. OBERG
3,421,472
AMPHIBIOUS VEHICLE
Filed April 10, 1967
Sheet 2 of 5
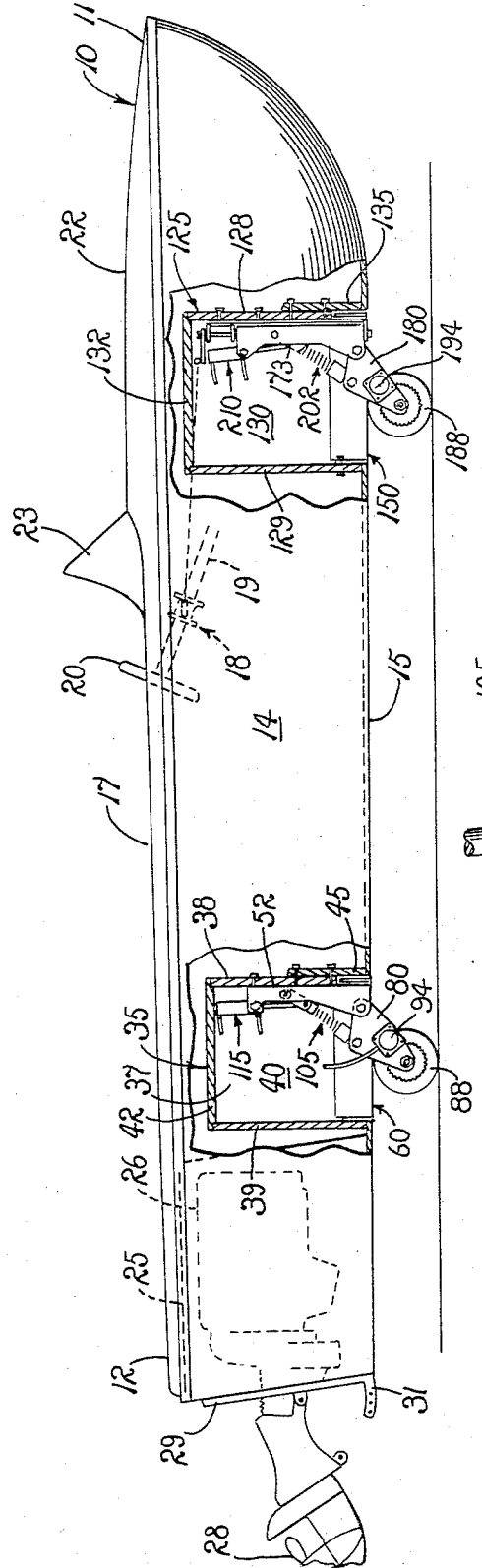
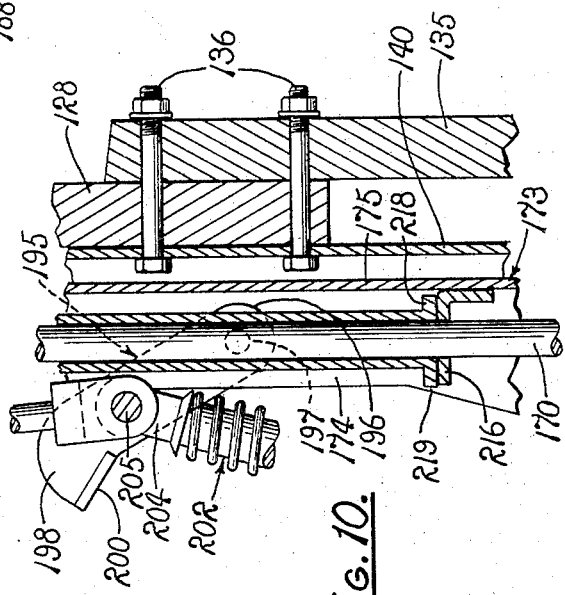
HUGH E. OBERG
INVENTOR
Huebner & Worrel
ATTORNEYS Jan. 14, 1969  H. E. OBERG  3,421,472
AMPHIBIOUS VEHICLE
Filed April 10, 1967
Sheet 3 of 5
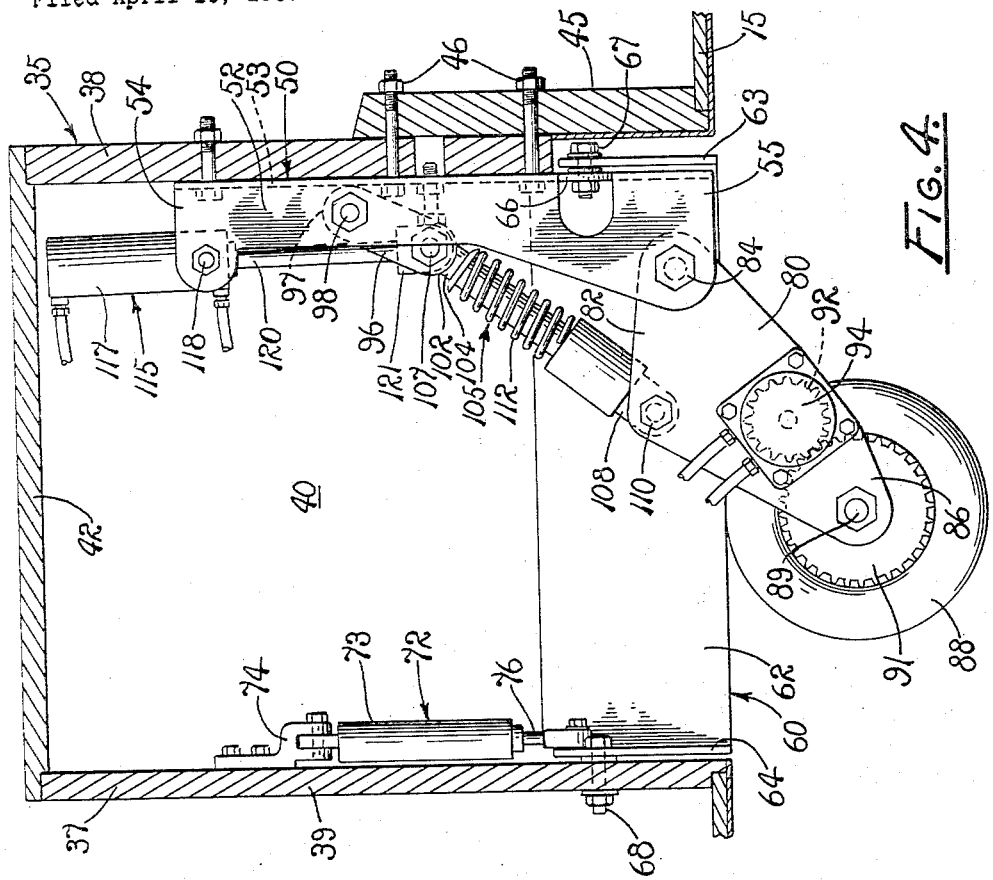
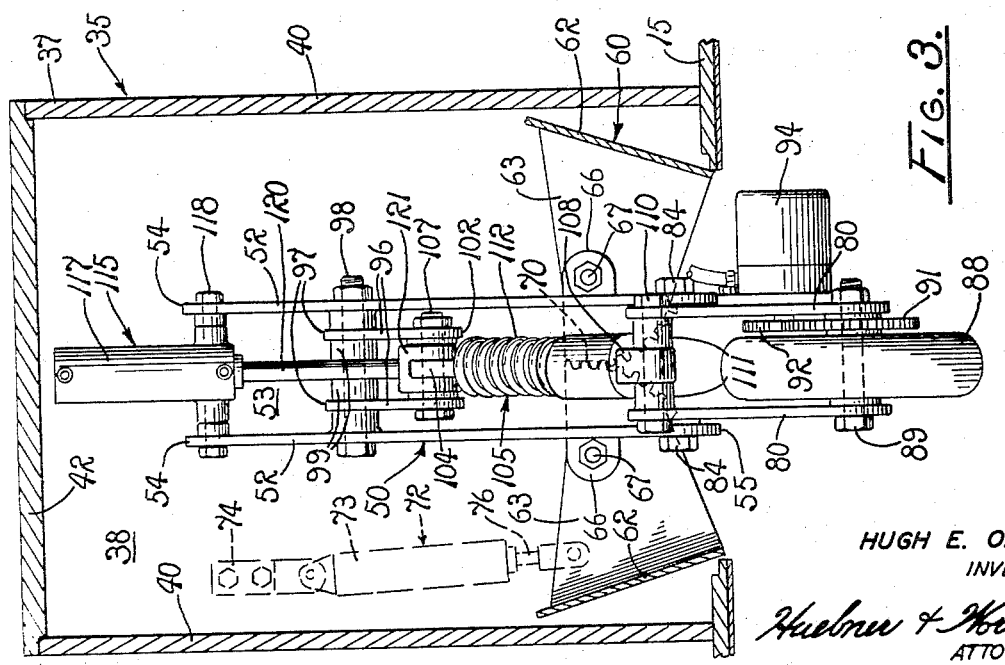
HUGH E. OBERG
INVENTOR
Huebner & Worrel
ATTORNEYS

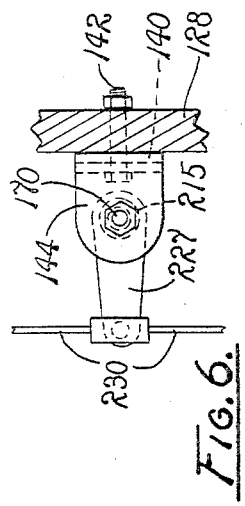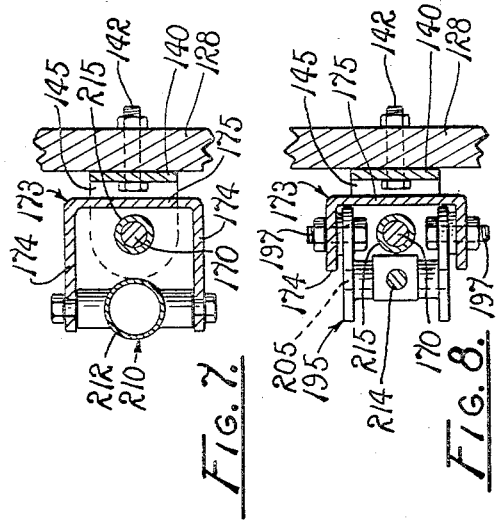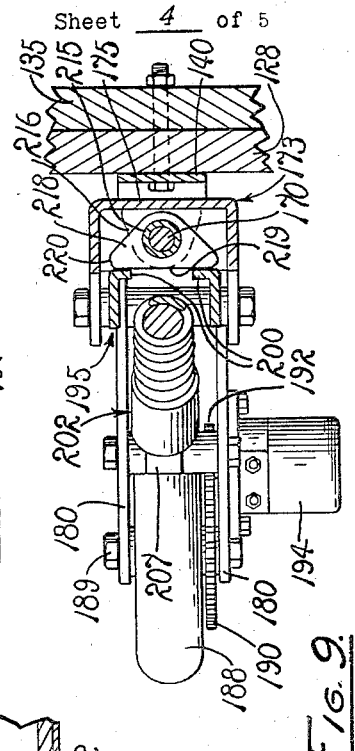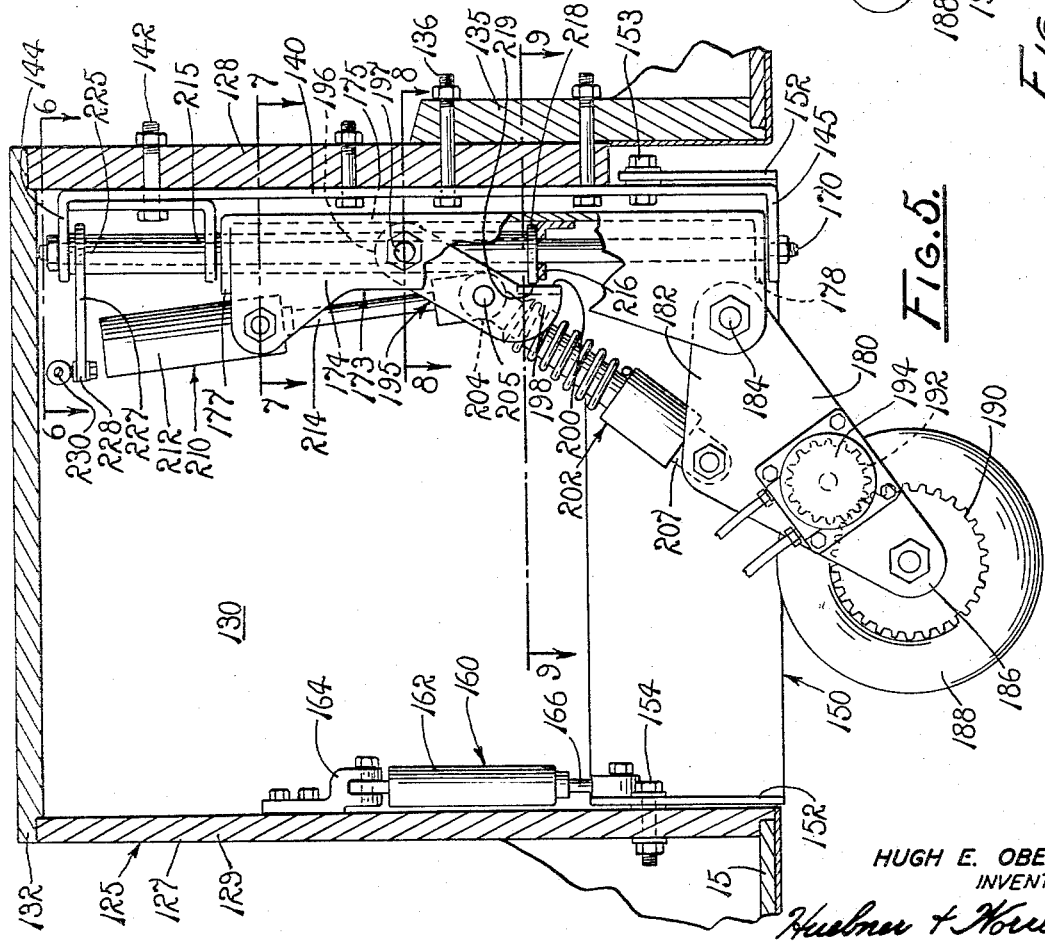

United States Patent Office 3,421,472
Patented Jan. 14, 1969

3,421,472
AMPHIBIOUS VEHICLE
Hugh E. Oberg, Fresno, Calif., assignor of twenty-five percent each to Frank Fasano and Edmund C. Giusti, Fresno, Calif.
Filed Apr. 10, 1967, Ser. No. 629,530
U.S. Cl. 115—1
Int. Cl. B60f 3/00
7 Claims

ABSTRACT OF THE DISCLOSURE

A vehicle having a water-tight hull providing a plurality of forwardly and rearwardly disposed support wheels which are extendibly and retractably mounted individually within wells disposed within the hull. The wells include pairs of doors which are disposed in selectively opening and closing relation to the wells. The doors are opened to permit extension of the wheels for supporting the hull for land travel and closed upon retraction of the wheels into the wells to provide a clean bottom along the hull during water travel. A forwardmost wheel is connected to a rudder steering system on the vehicle through an interlock mechanism for steering the vehicle during land travel. The forwardmost wheel is releasable from the interlock mechanism to disconnect the wheel from the steering system when the wheels are retracted for water travel.

BACKGROUND OF THE INVENTION

The beaching and launching of power boats through the breaking surf along seashores and in even calmer waters have long been a problem. When approaching the beach, the water is usually not of sufficient depth to permit operation of an outboard propeller drive employed on many of the relatively small power boats. As soon as the rotation of the propeller is stopped and the propeller lifted from the water, steerageway is lost and the boat must be manually dragged onto the beach. This, of course, requires the occupants of the boat to wade a substantial distance through the surf. This frequently is difficult and extremely hazardous, particularly when relatively large waves are encountered and where rocky shoals, reefs or the like are present. Similarly, when launching, the boat must be manually dragged a substantial distance into the water before floatation is effected and the water is of sufficient depth to permit extension of the propeller to its operating position. This operation must be precisely timed between the incoming waves to avoid having the boat tossed back onto the beach. This creates an even greater hazard than is present during the beaching operation inasmuch as there is only approximately eight seconds between the incoming waves in which to launch the boat and to start the motor to insure power steerage and adequate control. The conventional launching systems provided on portable boat trailers and the like are obviously inadequate for use in beaching and launching boats through a breaking surf.

Accordingly, it is an object of the present invention to provide an amphibious vehicle which is capable of being launched and beached through a breaking surf and other difficult situations under its own power without loss of steerageway.

Another object is to provide such an amphibious vehicle which is capable of being launched or beached through a breaking surf or the like without requiring the occupants to remove themselves from the vehicle.

Another object is to provide an amphibious vehicle of the character described which has a plurality of support wheels which are extendible for land travel and retractable within the vehicle for unrestricted water travel.

Another object is to provide such a vehicle wherein at least one of the support wheels is steerable and connectable to the rudder steering system of the vehicle when the wheels are extended for land travel.

Another object is to provide such a vehicle wherein the steerable wheel is automatically disconnected from the rudder steering system when retracted for water travel.

Other objects and advantages of the present invention will subsequently become more clearly apparent upon reference to the following description and accompanying drawings.

BRIEF DESCRIPTION OF THE DRAWINGS

FIG. 2 is a side elevation of the vehicle with portions broken away for illustrative convenience.

FIG. 3 is a somewhat enlarged transverse vertical section, taken on line 3—3 of FIG. 1, showing a rear drive wheel and mounting structure for the vehicle in rear elevation.

FIG. 4 is a somewhat enlarged longitudinal vertical section showing the drive wheel of FIG. 3 in side elevation.

FIG. 5 is a somewhat enlarged longitudinal vertical section, taken substantially centrally through a portion of the vehicle showing a forward steerable wheel and mounting structure in side elevation.

FIG. 6 is a somewhat enlarged fragmentary horizontal cross section, taken generally along the line 6—6 of FIG. 5 of the forward wheel mounting structure.

FIG. 7 is a somewhat enlarged fragmentary horizontal section through the wheel mounting structure, taken generally along line 7—7 of FIG. 5.

FIG. 8 is a somewhat enlarged fragmentary horizontal cross section, taken generally on line 8—8 of FIG. 5, through the wheel mounting structure.

FIG. 9 is a somewhat enlarged fragmentary horizontal section, taken generally on line 9—9 of FIG. 5.

FIG. 10 is a further enlarged fragmentary cross section showing the steerable wheel support structure in a retracted position.

DESCRIPTION OF THE PREFERRED EMBODIMENT

Figure 1:
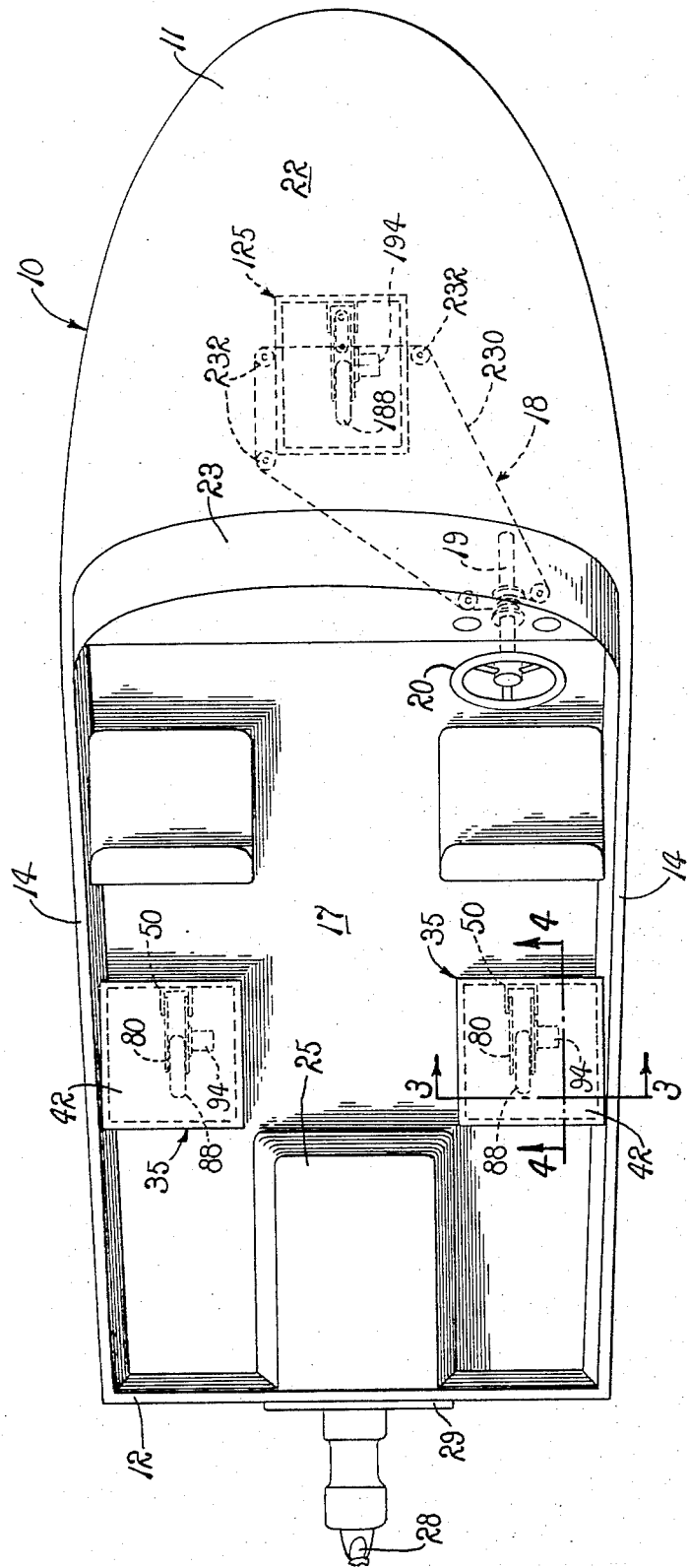
FIG. 1 is a top plan view of the amphibious vehicle embodying the principles of the present invention.
Figure 11:
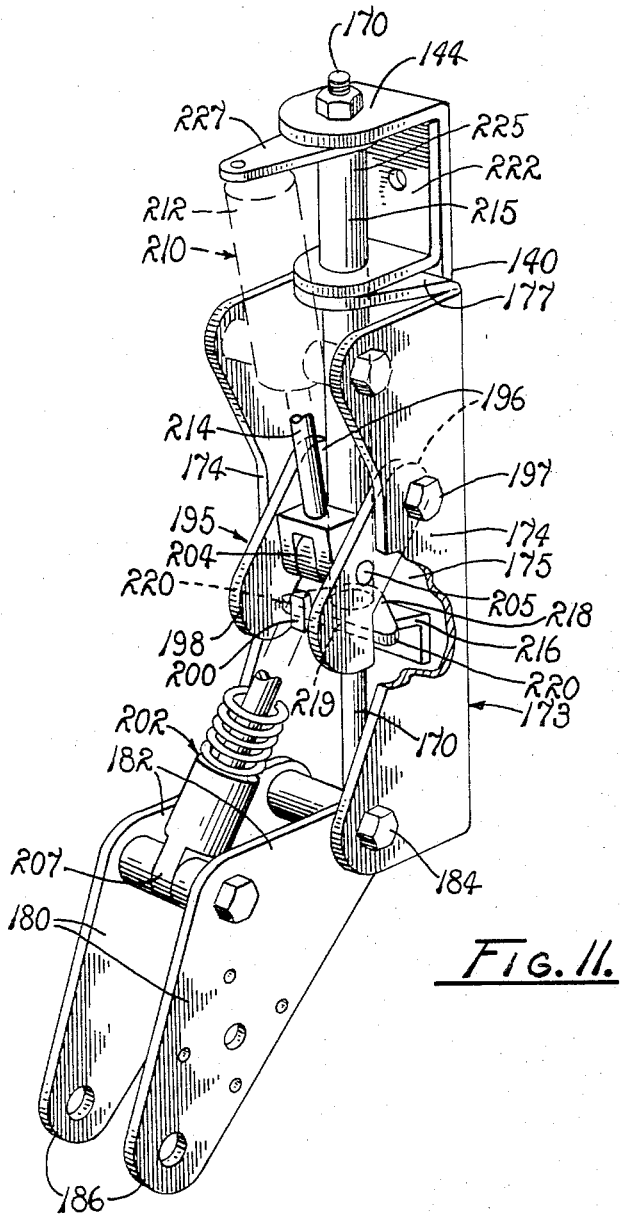
FIG. 11 is a perspective of the mounting structure for the steerable front wheel of the vehicle.

Referring more particularly to the drawings, an amphibious vehicle embodying the principles of the present invention is shown having an elongated water-tight hull 10 providing opposite bow and stern portions 11 and 12, respectively. The hull includes opposite sides 14 and a bottom 15. A passenger compartment 17 is disposed within the hull and provides a vehicle steering system generally indicated by the reference numeral 18 having an elongated steering column 19 and a steering wheel 20. The hull further includes an upper forwardly disposed deck 22, a windshield 23, and a rearward removable housing 25 for an engine indicated in dashed lines at 26 adjacent to the stern 12. An outboard rudder borne propeller 28 is pivotally mounted on the stern by a mounting board 29 having a rearwardly arcuately upwardly extended bracket 31 adjustably to hold and position the propeller in several downwardly adjusted operating positions.

A pair of rearwardly disposed wheel receiving wells 35 are formed in the bottom 15 of the hull 10 in transversely spaced relation individually adjacent to the opposite sides 14. Inasmuch as the rear wells and associated structure are identical, only one is described with corresponding reference numerals applied to the same elements of the other. As best shown in FIGS. 3 and 4, each of the rear wells is formed by a water-tight housing or enclosure 27 having opposite forward and rearward walls 38 and 39, respectively, opposite side walls 40, and a top wall 42. The forward wall 38 terminates short of the bottom 15 of the hull 10 and is rigidly connected to a substantially upright bulkhead 45 by a plurality of bolt and nut assemblies 46. An elongated channular wheel mounting bracket 50 having opposite sides 52 and a back portion 53 is mounted in substantially upright position within the rear well 35 on the forward wall 38 by bolt and nut assemblies 46. The bracket further includes opposite upper and lower ends 54 and 55, respectively.

A pair of clam shell doors 60 are pivotally mounted in opening and closing relation to each of the rear wells 35. Each of the doors includes a bottom panel 62 having substantially upstanding opposite forward and rearward ends 63 and 64, respectively. The forward end 63 is pivotally mounted on an ear 66 laterally extended from the side wall 52 of the bracket 50 adjacent to the lower end 55 thereof by a pivot bolt 67 beneath the forward wall 38 of the well 35. The rear end 64 of the door is pivotally mounted on the rear wall 39 of the enclosure 37 by a pivot bolt 68 disposed in coaxial relation with the pivot bolt 66.

The doors 60 include inner meshing arcuate gear segments 70 for simultaneous transverse swinging movement of the doors between retracted positions opening the rear well 35, as shown in FIGS. 3 and 4, and lower positions coextensive with the bottom 15 of the hull 10 in closing relation to the well. Such movement is effected by an hydraulic jack 72 having a cylinder end 73 pivotally connected to the rear wall 39 of the enclosure 37 by a bracket 74. The jack includes a piston rod end 76 which is pivotally connected to the rear end 64 of one of the doors in eccentric relation to its respective pivot bolt 66. It is noted that when the doors are disposed in their lower closed positions, it is not intended that they seal the well in water-tight condition. Accordingly, any water trapped within the well is permitted to drain therefrom through the abutting portions of the doors during planing of the boat on water and during land travel.

A pair of spaced substantially parallel wheel mounting arms 80 provide upper ends 82 individually pivotally mounted on the lower ends 55 of the bracket 50 by a pivot bolt 84. The arms include lower ends 86 between which is mounted a rear vehicle supporting and drive wheel 88 on an axle 89 extended through the arms. The wheel includes a drive gear 91 which is disposed in meshing relation to a powered gear 92 extended from an hydraulic motor 94 mounted on one of the wheel mounting arms 80.

A pair of control links 96 are pivotally mounted at their upper ends 97 on the bracket 50 intermediate its upper and lower ends 54 and 55, respectively. As best shown in FIG. 3, the upper ends of the links are journaled on a pivot bolt 98 in transversely spaced substantially parallel relation to each other and are inwardly spaced from the opposite sides 52 of the bracket by a plurality of space sleeves 99. The links include lower ends 102 between which is disposed the upper end 104 of a compressible link 105. The upper end of the compressible link is pivotally mounted on the lower ends of the links by a pivot pin 107 extended therethrough. The compression link 105 has a lower end 108 which is pivotally connected to the upper end 82 of the wheel mounting arms 80 in eccentric relation to the pivot bolt 84 on the bracket 50. Such connection is provided by a pivot bolt 110 mounted in the arms and a pair of spacers 111 disposing the lower end of the compression link centrally between the arms. The compression link is shown having a spring 112 disposed intermediate its ends to permit extension and contraction of the link incident to the wheel 88 traversing elevations and depressions in the terrain over which the vehicle is traveled. It is readily apparent that the compression link is not restricted to such specific showing but may be constructed in any suitable manner to provide the desired extension and retraction so as to serve as a shock absorber between the wheel mounting arms and the bracket 50.

An hydraulic jack 115 is operatively associated with the above described wheel mounting structure in order to swing the rear wheels 88 between the full line extended position of FIGS. 3 and 4, when the doors 60 are open, and a position retracted into the well 35, as shown in dashed lines in FIG. 4, in order to permit closing of the doors. The hydraulic jack includes a cylinder portion 117 which is trunnion mounted on the upper end 54 of the bracket 50 and between the opposite sides 52 thereof by a pivot shaft 118. An elongated piston rod 120 is reciprocably extendible from the jack and has a head end portion 121 pivotally journaled on the pivot pin 107 at the lower ends 102 of the links 96. As best shown in FIG. 4, when the wheel is disposed in its extended position, the pivot pin 107 is disposed in an over-center position with respect to a line passing through the pivot bolts 98 and 110 dependably to hold the links and compression link in their extended positions to preclude inadvertent retraction of the wheel mounting arms 80.

A forwardly disposed wheel well 125 is located within the bow 11 of the hull 10 beneath the deck 22. The forward well is substantially identical to the rear wells 35 and provides a substantially water-tight enclosure 127 having opposite forward and rearward walls 128 and 129, respectively, opposite side walls 130, and a top wall 132. The forward wall is rigidly secured to a bulkhead 135 disposed in substantially upright position from the bottom 15 of the hull by a plurality of bolt and nut assemblies 136. An elongated support plate 140 is disposed within the forward well 125 and is centrally mounted in substantially upstanding relation on the forward wall 128 by the bolt and nut assemblies 136 and a plurality of upper bolt and nut assemblies 142 extended only through the support plate and the forward wall. The support plate provides opposite right-angularly rearwardly extended upper and lower bored ends 144 and 145, respectively.

A pair of clam shell doors 150, substantially identical to the doors 60 of the rear wells 35, are disposed in opening and closing relation to the front wheel well 125. The doors 150 individually provide opposite mounting ends 152 which are individually pivotally mounted by coaxially related pivot pins 153 and 154, respectively extended through the support plate 140 and the rearward wall 129 of the enclosure 127. Although not shown, the doors include meshing inner gear segments identical to the gear segments 70 of the doors 60 for simultaneous movement between their open and closed positions. This movement is effected by an hydraulic jack 160 having a cylinder end 162 mounted on the rear wall 129 of the enclosure 127 by a bracket 164. The jack further includes a piston rod end 166 pivotally connected to one of the doors 150.

An elongated support rod or post 170 is mounted in substantially upright position through the upper and lower bored ends 144 and 145 of the support plate 140. A swivel bracket 173, similar to the bracket 50 of the rear wheels 88, is disposed within the forward wheel well 125 for reciprocable swinging movement about the substantially vertical axis of the support rod 170. The swivel bracket has a pair of opposite sides 174 and a back 175 having continuous right-angularly related upper and lower end portions 177 and 178, respectively, through which the support rod is extended to mount the bracket for such swinging movement. A pair of wheel mounting arms 180 provide upper ends 182 which are individually pivotally mounted on the sides 174 of the bracket adjacent to its lower end by pivot bolts 184. The arms include opposite lower ends 186 between which is mounted a forward steerable wheel 188 for rotation about an axle 189 extended through the arms. The wheel includes a drive gear 190 disposed in meshing relation to a powered gear 192 extended from an hydraulic motor 194 mounted on one of the wheel mounting arms 180.

A pair of wheel actuating and orienting links are pivotally mounted at their upper ends 196 individually on the opposite sides 174 intermediate the ends of the bracket 173 by pivot bolt and nut assemblies 197. The links include lower ends 198 which have forwardly facing obtusely angularly related foot portions 200. An elongated compressible link 202 substantially identical to the rear compressible links 105 provides an upper end 204 pivotally connected to the links 195 intermediate their ends by a pivot pin 205. The compressible link includes a lower end 207 which is pivotally connected to the wheel mounting arms 180 in eccentrically disposed relation to the pivot bolts 184 on the bracket 173.

An hydraulic jack 210 is operatively associated with the described front wheel mounting linkage for swinging the wheel between its full line extended position of FIG. 5 and a position retracted into the well 125. The hydraulic jack includes a cylinder end 212 which is trunnion mounted between the opposite sides 174 at the upper end of the swivel bracket 173. The hydraulic jack further includes a piston rod end 214 which is journaled on the pivot pin 205 intermediate the ends of the wheel orienting links 195.

An elongated tubular sleeve 215 is journaled upon the support rod 170 and extends downwardly from the upper end 144 of the support plate 140, through the upper end portion 177 of the back 175 of the swivel bracket 170 rotatably to rest upon a rigid support plate 216 secured to the back of the swivel bracket. The sleeve provides a lower integral flange or cam 218 having a rearwardly disposed substantially flat side 219 and arcuate end portions 202 eccentrically related to the support rod 170. The upper end of the sleeve is also extended through an upper supporting bracket 222 which is secured to the support plate 140 by the bolt and nut assembly 142. The sleeve includes an upper end 225 on which is mounted a rearwardly extended lever 227 having an outer end 228 connected to an elongated cable 230. As best shown in FIG. 1, the cable 230 is trained about the periphery of a plurality of cable sheaves 232 for connection to the steering column 19 of the steering system 18 of the vehicle.

OPERATION

The operation of the described embodiment of the subject invention is believed to be clearly apparent and is briefly summarized at this point. As best shown in FIG. 2, the amphibious vehicle of the present invention is conditioned for land travel with the forward and rearward wheels 188 and 88, respectively, extended below the hull 10 to support the vehicle in elevationally spaced relation to the ground. The outboard propeller 28 is constrained in its upwardly swung, non-operating position to provide sufficient clearance for passing over obstructions and the like in the terrain traversed. Such traversement of the vehicle is accomplished by operation of the engine 26 to drive an hydraulic pump, not shown, to provide a source of hydraulic fluid under pressure to actuate the hydraulic motors 94 on the rear wheels 88 and the hydraulic motor 194 on the front wheel 188. The motors are controlled by suitable valves, not shown, mounted adjacent to the steering wheel 20. Alternatively, the wheels may be belt or chain driven by a suitable linkage between the wheels and a transmission releasably connectable with the engine in the usual manner.

During the above described ground traversement of the vehicle, the hull 10 may be steered by manipulation of the steering wheel 20. Upon actuation of the steering wheel, the cable 230 is tensioned to swing the lever 227 so as to rotate the sleeve 215 and the cam 218 on the support rod 170. Such movement is transmitted to the front wheel 188 by engagement of the cam with the foot portions 200 of the orienting links 195. Accordingly, the entire wheel mounting structure including the swivel bracket 173, the compression link 202, and the wheel mounting arms 180 are angularly disposed relative to the longitudinal axis of the hull 100 to effect the desired steering of the vehicle. The vehicle is also readily adaptable for towed land travel by connecting a suitable draft tongue, not shown, to the front wheel mounting arms 180. The vehicle can thereby be maneuvered by hand in much the same manner as an airplane during parking operations or the draft tongue may be connected to the trailer hitch of a prime mover for long distance highway transport.

With the vehicle conditioned for land travel, the vehicle may be driven into the surf or other body of water for launching the hull under full power, or as otherwise desired, irrespective of the magnitude of the waves. During such launching, as soon as the water is of sufficient depth to float the hull, the front and rear wheels 188 and 88, respectively, are retracted into their associated wells 35 and 125. Such retraction is accomplished by retraction of the hydraulic jacks 210 and 115. Upon full retraction of the wheels, the hydraulic jacks 106 and 72 are actuated to extend their piston rod ends 166 and 76 to swing their associated doors 150 and 60 to positions closing the wells. Although not shown, suitable valving is provided in order automaticaly to effect the described sequential operation of the wheels and the doors. At the same time, the propeller 28 is lowered to its operating position and actuated in the usual manner by its connection to the engine 26 which is preferably already running. Accordingly, during the launching operation, there is no appreciable loss of steerageway during the described conversion from the wheel drive to the propeller drive. Inasmuch as the retractable wheels and doors provide a clean bottom for the hull, the vehicle's performance on the water is not impaired to any significant extent.

The vehicle may be similarly beached through a breaking surf under full power. During such operation, the doors 60 and 150 are opened by retraction of their respective hydraulic jacks and the wheels lowered by extension of the hydraulic jacks associated with their respective wheel mounting linkages. As the vehicle approaches the beach, the forward wheel 188 is initially grounded to provide a tractive force for pulling the hull 10 landward prior to grounding of the rear wheels 88. This assures no appreciable loss of steerageway during such beaching operation particularly when gradually sloping beaches are encountered where the shallow depth of the water requires the propeller 28 to be raised prior to engagement of the rear wheels with the ground. It is noted that the forward steerable wheel 188 is always precisely oriented with respect to the steering wheel 20 when converting the vehicle from water travel to travel upon the land. As best shown in FIG. 9, if during the wheel lowering operation the forward wheel mounting structure is misaligned from the cam 218, one of the foot portions 200 of the orienting links 195 engages one of the end portions 220 and serves as a fulcrum point about which the cam and the orienting links are swung by the force of the jack 210 until both foot portions are disposed in intimate facing engagement against the flat rear side 219 of the cam. With the cam and orienting links disposed in the position of FIG. 9, any movement of the steering wheel 20 will be transmitted therethrough to the wheel mounting arms 180 angularly to position the wheel for effecting steering of the vehicle. It is readily apparent that upon retraction of the forward wheel and upward swinging movement of the orienting links 195 to the position shown in FIG. 10, the steering system is disconnected from the front wheel mounting structure to permit unrestricted movement of the steering wheel 20 for steering the hull in the usual manner during water travel.

In view of the foregoing, it is readily apparent that the structure of the present invention provides an improved amphibious vehicle which may be either launched or beached through a breaking surf under full power without any appreciable loss of steerageway or control of the vehicle. The present invention permits the vehicle to be beached or launched without any tedious manipulation or connection of the vehicle with any remotely located source of power such as the previously described launching and retrieving ramps, winches, and the like. The support wheels of the vehicle are fully retractable into the hull so as not to impair the operation and maneuverability of the vehicle during water travel. The steerable front wheel is automatically disconnected from the steering system during water travel and is automatically recoupled with the steering system during extension of the wheels for land travel.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An amphibious vehicle comprising a water-tight hull having predetermined bow and stern portions and a bottom providing a plurality of water-tight wells extended into the hull respectively adjacent to said bow and stern portions thereof, closure means providing a pair of clam shell doors pivotally mounted in each of said wells in selectively opening and closing relation to the wells and having intermeshing gear tooth segments, vehicle support means extendibly-retractably mounted in the wells, and powered means borne by the hull within said wells having pivotal connection to one of said doors within its respective well selectively to swing the doors between their opened and closed positions.

2. The amphibious vehicle of claim 1 in which said vehicle support means comprises a plurality of wheels; and pivot means swingably mounting the wheels for movement between lowered positions extended below the bottom of the hull when said doors are opened, and positions retracted into their respective wells when the doors are closed.

3. The amphibious vehicle of claim 2 including a rudder steering system mounted within the hull, and pivot means in the well adjacent to said bow portion of the hull including a swivel bracket mounted in the well for pivotal movement about a substantially upright axis, and interlock means connecting said steering system and said bracket for steering the vehicle when the wheel is disposed in said extended position from the well and being automatically releasable to disconnect said bracket from the steering system when the wheel is disposed in its retracted position within the well.

4. The amphibious vehicle of claim 3 wherein said swivel bracket is journaled on a substantially upright rod, a cam journaled on the rod and being connected to said steering system, cam engaging means pivotally mounted on the bracket, said wheel pivot means being pivotally connected to said bracket in spaced relation to said cam engaging means, a compression link interconnecting said pivot means and said cam engaging means, and powered means borne by the bracket for selectively raising and lowering said cam engaging means and said pivot means so that upon lowering of the wheel said cam engaging means abuts the cam properly to orient the bracket, pivot means, and the wheel with the steering system.

5. An amphibious vehicle comprising a water-tight hull having predetermined bow and stern portions and a bottom providing a forward water-tight well extended into the hull adjacent to said bow portion and a pair of rear water-tight wells disposed in transversely spaced relation adjacent to said stern portion of the hull; a rudder steering system disposed within the hull, a pair of clam shell doors disposed in each of said wells having intermeshing gear tooth segments; powered means borne by the hull within said wells having pivotal connection to one of said doors selectively to swing the doors between alternate positions opening and closing said wells; a pair of powered rear support wheels; pivot means swingably mounting the wheels for movement between lowered positions extended below the bottom of the hull when said doors are opened, and positions retracted into their respective rear wells when the doors are closed; a forward steerable wheel disposed within said forward well; a rod mounted in the forward well in stationary substantially upright position; an elongated channular swivel bracket having opposite upper and lower ends journaled on said rod; a pair of pivot arms pivotally mounted on said bracket adjacent to its lower end and supporting said forward wheel for elevational swinging movement between extended and retracted positions; a pair of interconnected transversely spaced wheel orienting links pivotally connected to said bracket intermediate its ends; a compression link pivotally interconnecting said orienting links and said pivot arms, a cam having an elongated sleeve portion journaled on the rod and being connected to the steering system of the vehicle; and powered means borne by the bracket adjacent to its upper end and pivotally connected to said orienting links for engagement of the links with the cam incident to lowering of said forward wheel to its extended position so as properly to orient the forward wheel with respect to the steering system of the vehicle and to connect them for steering the vehicle during land travel, and said arms being movable away from said cam incident to retraction of the forward wheel into the forward well to disconnect the forward wheel from said steering system.

6. The amphibious vehicle of claim 5 in which said cam provides a substantially flat surface having arcuate end portions eccentrically related to said rod, said orienting links including spaced substantially flat foot portions individually engageable with said opposite ends of the cam to rotate the cam and sleeve incident to engagement of only one of said foot portions with its corresponding end portion of the cam.

7. An amphibious vehicle comprising a water-tight hull having a bottom providing a plurality of water-tight wells extended into the hull, closure means providing a pair of clam shell doors interconnectably pivotally mounted in each of said wells in selectively opening and closing relation to the wells, vehicle support means extendibly-retractably mounted in the wells, and powered means borne by the hull within said wells for connection to their respectively associated doors to swing the doors between their selectively opened and closed positions.

References Cited

UNITED STATES PATENTS 3,280,785   10/1966   Mycroft _____ 115—1

ANDREW H. FARRELL, *Primary Examiner.*